UNITED STATES PATENT OFFICE.

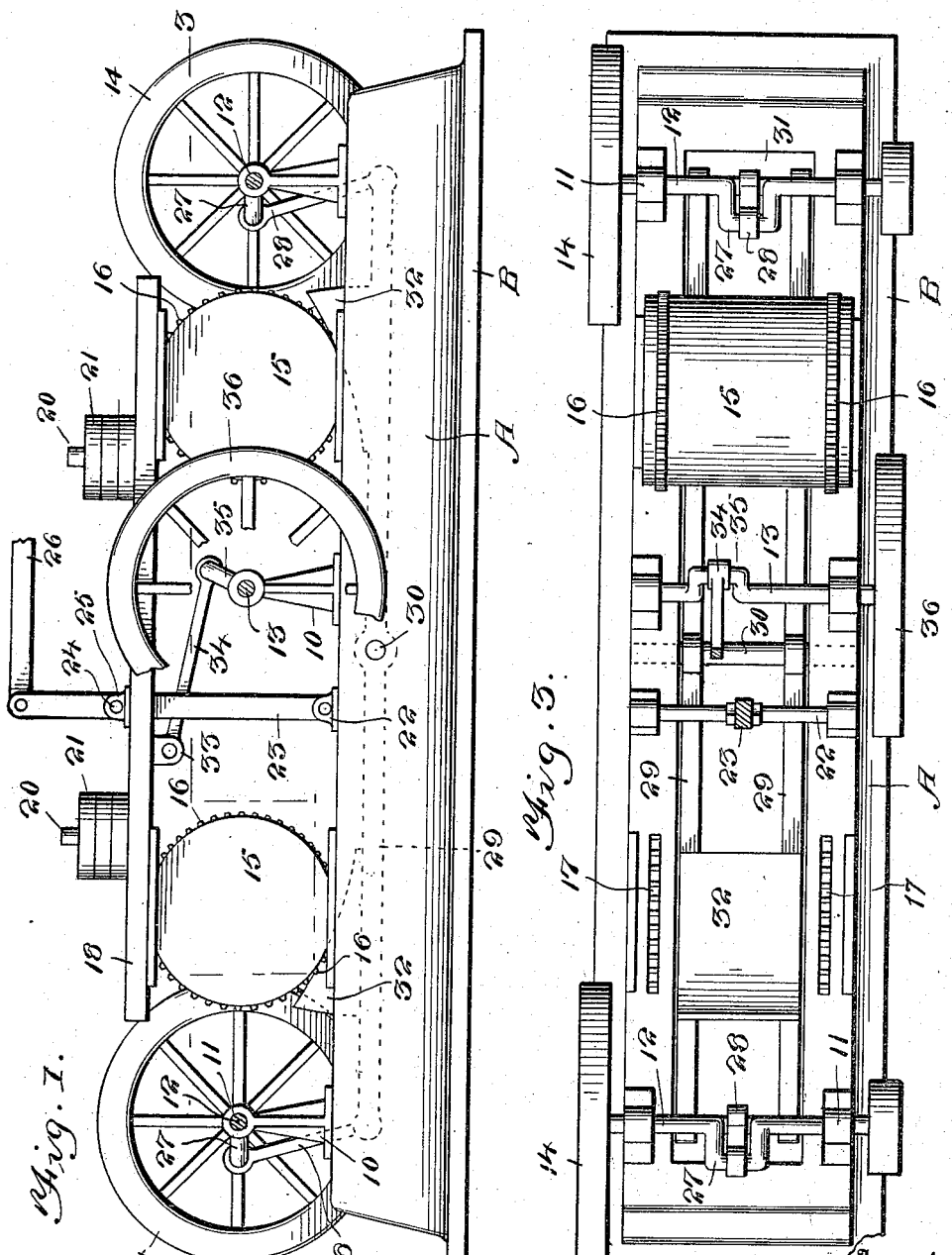

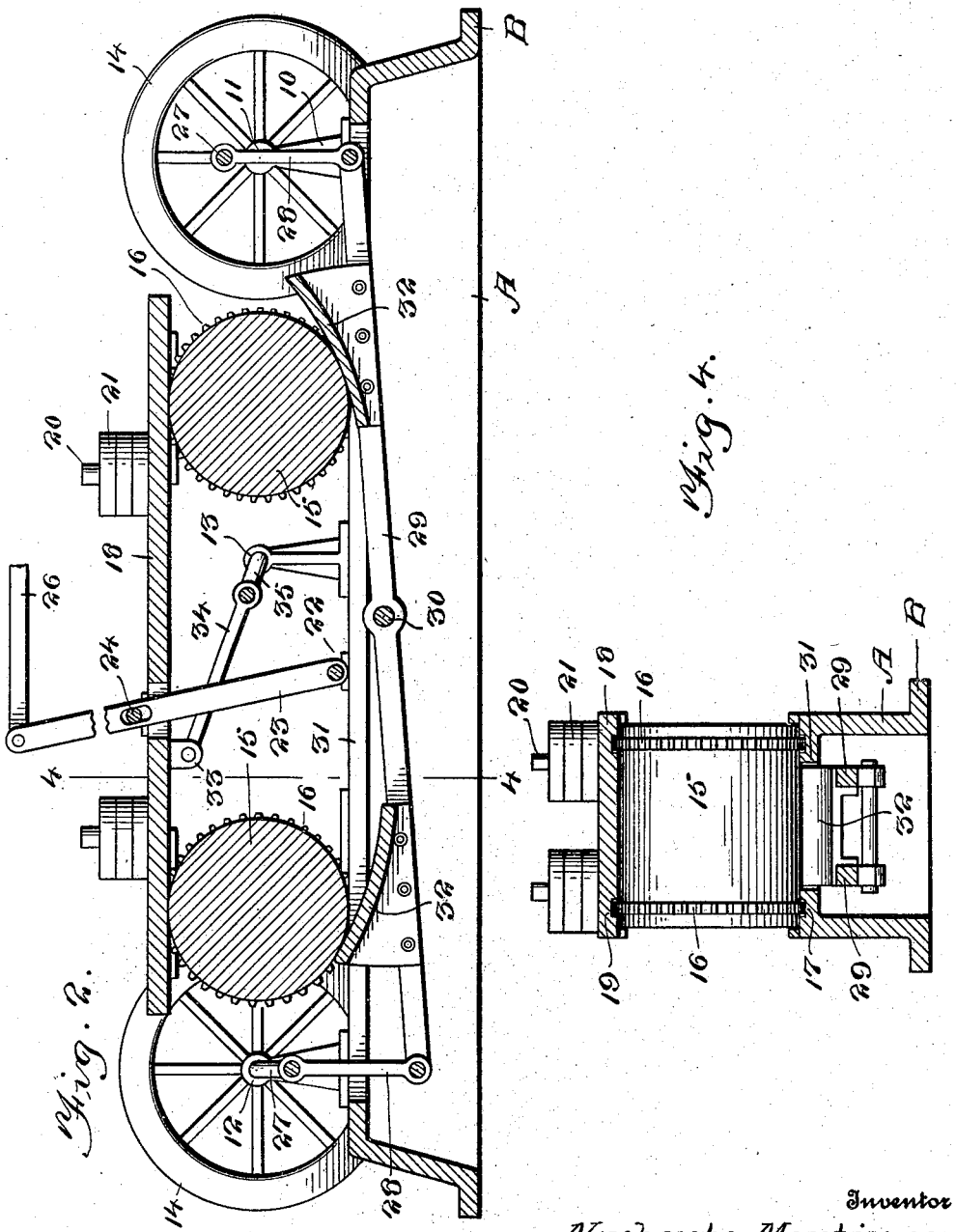

NORBERTO MARTINEZ, OF COTULLA, TEXAS.

WEIGHT-MOTOR.

1,191,018. Specification of Letters Patent. Patented July 11, 1916.

Application filed August 17, 1915. Serial No. 45,964.

*To all whom it may concern:*

Be it known that I, NORBERTO MARTINEZ, a citizen of Mexico, residing at Cotulla, in the county of Lasalle and State of Texas, have invented new and useful Improvements in Weight-Motors, of which the following is a specification.

The invention relates to transmission mechanism, and more particularly to improvements in the structure forming the subject-matter of Letters Patent No. 1,112,375, issued to me on or about the 29th day of September, 1914.

The primary object of the invention is the provision of transmission mechanism of this character wherein reciprocating motion is converted into rotary motion with multiplied power, the structure including a minimum number of parts without decreasing the strength and durability thereof, nor the power derived therefrom.

Another object of the invention is the provision of transmission mechanism of this character wherein the movable parts are mounted for true motion to avoid any possibility of lost motion in the working thereof.

A further object of the invention is the provision of transmission mechanism of this character wherein maximum propelling force is attained without excessive energy.

A still further object of the invention is the provision of a transmission mechanism of this character which is extremely simple in construction, novel in form, thoroughly efficient in its operation, and inexpensive in maufacture.

With these and other objects in view, the invention consists in the construction, combination and arrangement of parts as will be hereinafter fully described, illustrated in the accompanying drawings, and pointed out in the claims hereunto appended.

In the drawings:—Figure 1 is a side elevation of a transmission mechanism constructed in accordance with the invention, showing its counter-balance wheel partly broken away. Fig. 2 is a vertical longitudinal sectional view thereof. Fig. 3 is a sectional view on the line 3—3 of Fig. 1. Fig. 4 is a sectional view on the line 4—4 of Fig. 2.

Similar reference characters indicate corresponding parts throughout the several views in the drawings.

Referring to the drawings in detail, the transmission mechanism comprises a base A formed with a marginal rest flange B, and upon this base are fixed, near opposite ends and at an intermediate point thereof, spaced vertical uprights 10 formed with bearings 11 in which are journaled transversely disposed shafts 12 and 13, respectively, each shaft 12 being fitted at one end with a fly wheel 14, and either of these shafts is adapted for the transmission of power to machinery or the like.

Supported upon the base A between the shafts 12 and 13 are bearing rollers 15, each being formed near opposite ends with peripheral gear teeth 16 which are adapted to mesh with rack teeth 17 formed on and set in the base A longitudinally thereof for a predetermined distance of the same, and in this manner the slipping of the rollers 15 upon the said base is obviated.

Superimposed upon the rollers 15 is a slide or movable table 18 which is formed on its under face with rack teeth 19 meshing with the teeth 16 at the peripheries of the rollers 15, so as to avoid the slipping of the slide or movable table during reciprocation thereof. On the slide or movable table 18 spaced from opposite ends thereof are vertical pins 20 on which are removably fitted weighted blocks 21, the rollers 15 being movable longitudinally of the base A for a limited distance, while pivoted to a bearing 22 at a point intermediate the ends of the base A is a rocking lever 23, the same being pivoted at 24 to bearing lugs 25 formed on the slide or slide or table 18, and this lever extends upwardly through the latter and has pivotally connected to its upper end a throw rod 26 so that driving energy can be imparted to the lever 23 for the rocking thereof, which transfers motion to the slide or table, which in turn rotates the rollers 15 on the base, for a purpose presently described.

The shafts 12 are formed with cranks 27 to which are loosely connected links 28, the same being also pivoted to rocking or walking beams 29 which are supported upon a pivot 30 common to both of the beams and mounted in the base. The base A is formed with a slot 31 through which work the links 28 and the beams 29, the latter being formed with tread shoes or blocks 32 which are reversely beveled with respect to each other and engage the rollers 15 so that the beams 29 will become active for the rotation of the shafts 12. As each roller 15 travels upon the beveled shoes or blocks 32 it causes the downward movement of the beams 29 carrying the same, and in this manner rotary movement is imparted to each shaft, so that reciprocatory movement is converted into rotary movement.

Pivotally connected to a bearing 33 depending from the under side of the slide or table 18 is an arm 34 which is also loosely connected to a crank 35 formed in the shaft 13, and to this shaft is fixed a counter-balance wheel 36 which serves to counter-balance the action of the slide or table 18, while the arm 34 serves to limit the throw thereof during the activity of the transmission mechanism.

It will be noted that the backward and forward movements of the roller 15 serve to move the beams 29 at opposite ends thereof, which causes a continuous rotation of the shafts 12 and from which similar motion will be imparted to machinery or the like for driving thereof.

In converting the reciprocating movement into rotary movement it will be apparent that by reason of the particular arrangement the power thereof is materially multiplied to give maximum force to the transmission mechanism without increasing the driving energy.

It is to be understood that changes, variations and modifications may be made in the structure such as come properly within the scope of the appended claims, without departing from the spirit of the invention or sacrificing any of its advantages.

What is claimed is:—

1. Mechanism of the class described comprising a support having rack teeth, walking beams pivotally mounted in the support, crank shafts journaled above the support, links loosely connected to the cranks and pivoted to the beams, beveled tread members on the beams, rollers movable on the support for working against the tread members to displace the beams and having peripheral gear teeth meshing with the rack teeth on the support, and mechanism operable upon the rollers to move the same.

2. Mechanism of the class described comprising a support having rack teeth, walking beams pivotally mounted in the support, crank shafts journaled above the support, links loosely connected to the cranks and pivoted to the beams, beveled tread members on the beams, rollers movable on the support for working against the tread members to displace the beams and having peripheral gear teeth meshing with the rack teeth on the support, mechanism operable upon the rollers to move the same, and means for controlling the movement of said mechanism.

3. Mechanism of the class described comprising a support having rack teeth, walking beams pivotally mounted in the support, crank shafts journaled above the support, links loosely connected to the cranks and pivoted to the beams, beveled tread members on the beams, rollers movable on the support for working against the tread members to displace the beams and having peripheral gear teeth meshing with the rack teeth on the support, mechanism operable upon the rollers to move the same, means for controlling the movement of said mechanism, and rotatable elements connected to the crank shafts.

4. Mechanism of the class described comprising a support having rack teeth, walking beams pivotally mounted in the support, crank shafts journaled above the support, links loosely connected to the cranks and pivoted to the beams, beveled tread members on the beams, rollers movable on the support for working against the tread members to displace the beams and having peripheral gear teeth meshing with the rack teeth on the support, a shiftable table supported by the rollers and having rack teeth meshing with the peripheral teeth on said rollers, and means for reciprocating the table.

5. Mechanism of the class described comprising a support having rack teeth, walking beams pivotally mounted in the support, crank shafts journaled above the support, links loosely connected to the cranks and pivoted to the beams, beveled tread members on the beams, rollers movable on the support for working against the tread members to displace the beams and having peripheral gear teeth meshing with the rack teeth on the support, a shiftable table supported by the rollers and having rack teeth meshing with the peripheral teeth on said rollers, means for reciprocating the table, and means for limiting the movement of the table.

In testimony whereof I affix my signature in presence of a witness.

NORBERTO MARTINEZ.

Witness:
BENNETT S. JONES.